J. T. PARKS & M. T. DAVIS, Jr.
MINE CAR WHEEL.
APPLICATION FILED SEPT. 11, 1908.
909,112.
Patented Jan. 5, 1909.
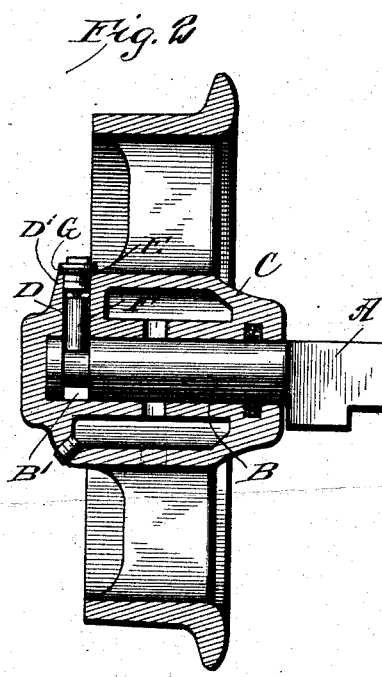
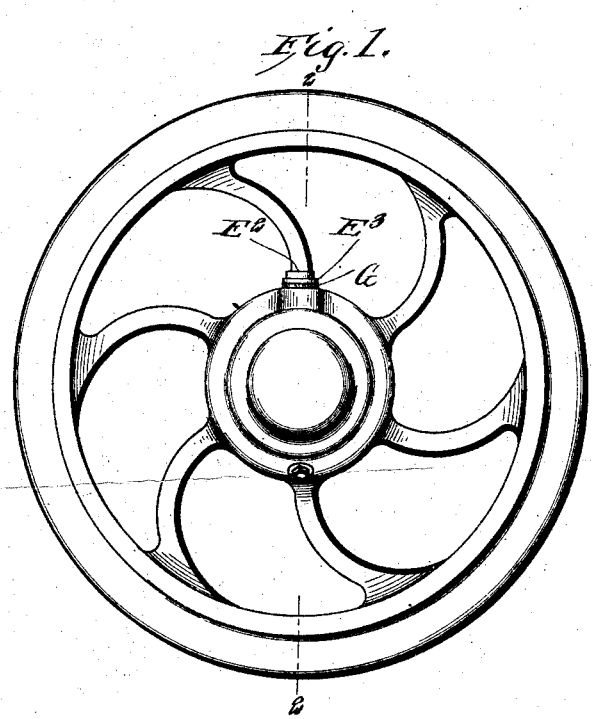
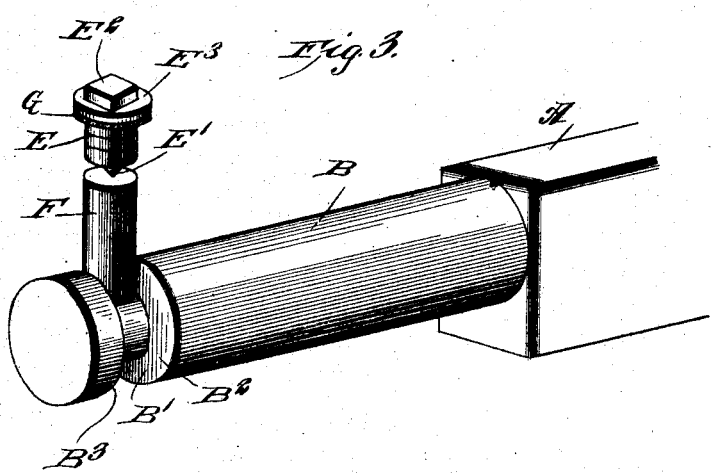
WITNESSES
E. M. Callaghan
Perry B. Turpin
INVENTORS
John T. Parks
Madison T. Davis Jr.
BY
Munn & Co.
ATTORNEYS

UNITED STATES PATENT OFFICE.

JOHN THOMAS PARKS AND MADISON THENTON DAVIS, JR., OF CHARLESTON, WEST VIRGINIA.

MINE-CAR WHEEL.

No. 909,112.          Specification of Letters Patent.          Patented Jan. 5, 1909.

Application filed September 11, 1908. Serial No. 452,547.

*To all whom it may concern:*

Be it known that we, JOHN THOMAS PARKS and MADISON THENTON DAVIS, Jr., citizens of the United States, and residents of Charleston, in the county of Kanawha and State of West Virginia, have invented certain new and useful Improvements in Mine-Car Wheels, of which the following is a specification.

This invention is an improvement in wheels, and especially in car wheels of the class illustrated by the patent to Bond, No. 786,405, dated April 4, 1905; and the invention consists in certain novel constructions and combinations of parts as will be hereinafter described and claimed.

In the drawings—Figure 1 is an end view. Fig. 2 is a vertical cross section on about line 2—2 of Fig. 1, of a wheel embodying the invention, and Fig. 3 is a detail perspective view showing the grooved spindle, and the hub securing pin, and the retaining screw.

As above suggested the invention is an improvement in the construction shown in the Bond patent, the present wheel being in the nature of an improved Bond wheel, and in carrying out the invention we provide the axle A with a spindle B, receiving the wheel C, the said spindle being provided near its outer end with an annular groove B'. The wheel has its hub provided with a radial aperture D, which is threaded at D' to receive the retaining screw E. The aperture D communicates at its inner end with the groove B' in the spindle and extends outwardly on an axis at a right angle to the axis of the spindle, and a pin F is fitted revolubly in the aperture D and extends at its inner end into the groove B' in the spindle, so that when in said groove it will operate to lock the wheel C on the spindle.

By preference the pin F is made of tool steel, is sawed off square at both ends and smoothed at said ends by emery or any other suitable way, and this pin is made of a diameter slightly less than the width of the groove B', said groove being usually made about one inch in width, and the pin F about three-quarters of an inch. In operation the pin F is adapted to be revolved by its engagement with either wall $B^2$ or $B^3$ of the groove B', and the pin is retained with its inner end in the groove B' by means of the retaining screw E, which is threaded to engage at D' with the threads in the wheel hub, and has at its inner end a point E', which centers against the outer end of the pin F, thus retaining the pin F, and as the latter turns freely on the point E', the pin F will be free to rotate and at the same time will not turn the retaining screw E to displace the same as will be understood from Figs. 2 and 3 of the drawings.

The screw E has a square or grooved head $E^2$ to facilitate its turning, and is also provided with a shoulder $E^3$ to abut the head. A leather or other suitable washer G is fitted beneath the shoulder $E^3$ of the retaining screw, as will be understood from the drawings. The point E' of the retaining screw is preferably case-hardened in practice.

By the described construction it will be noticed the pin F is securely held in place, is free to rotate, thus avoiding friction, and such rotation of the pin is permitted without endangering any displacement of the retaining screw as more fully described hereinbefore.

We claim—

1. The improvement herein described comprising the spindle having an annular groove, a wheel having its hub on said spindle, and provided with a radial aperture threaded at its outer end and communicating at its inner end with the spindle groove, and extending in a direction at a right angle to the axis of the spindle, a pin fitted revolubly in said aperture and extending at its inner end into the groove in the spindle and adapted to be revolved by its engagement with either side wall of the spindle groove, and operating at its outer end within the radial aperture in the hub, and a retaining screw threaded in the outer end of the aperture and having a shoulder to abut the hub, and provided at its inner end with a point centering at the outer end of the pin whereby the said pin will be retained with its inner end in the groove of the spindle, and will be free to rotate and will not operate to displace the retaining screw, all substantially as and for the purposes set forth.

2. The combination of a spindle having an annular groove, a wheel having its hub on said spindle and provided with an aperture for the reception of a securing pin, a pin in said aperture and extending at its inner end into the groove in the spindle and free to rotate within the said aperture of the hub, and a screw threaded in the said aperture and having at its inner end a point centering at the outer end of the pin, all substantially as and for the purposes set forth.

JOHN THOMAS PARKS.
MADISON THENTON DAVIS, JR.

Witnesses:
H. McC. ANDERSON,
KATE A. KAIN.